(No Model.) 3 Sheets—Sheet 1.
T. H. WORRALL & A. LESPERANCE.
FRICTION CLUTCH.
No. 606,634. Patented June 28, 1898.
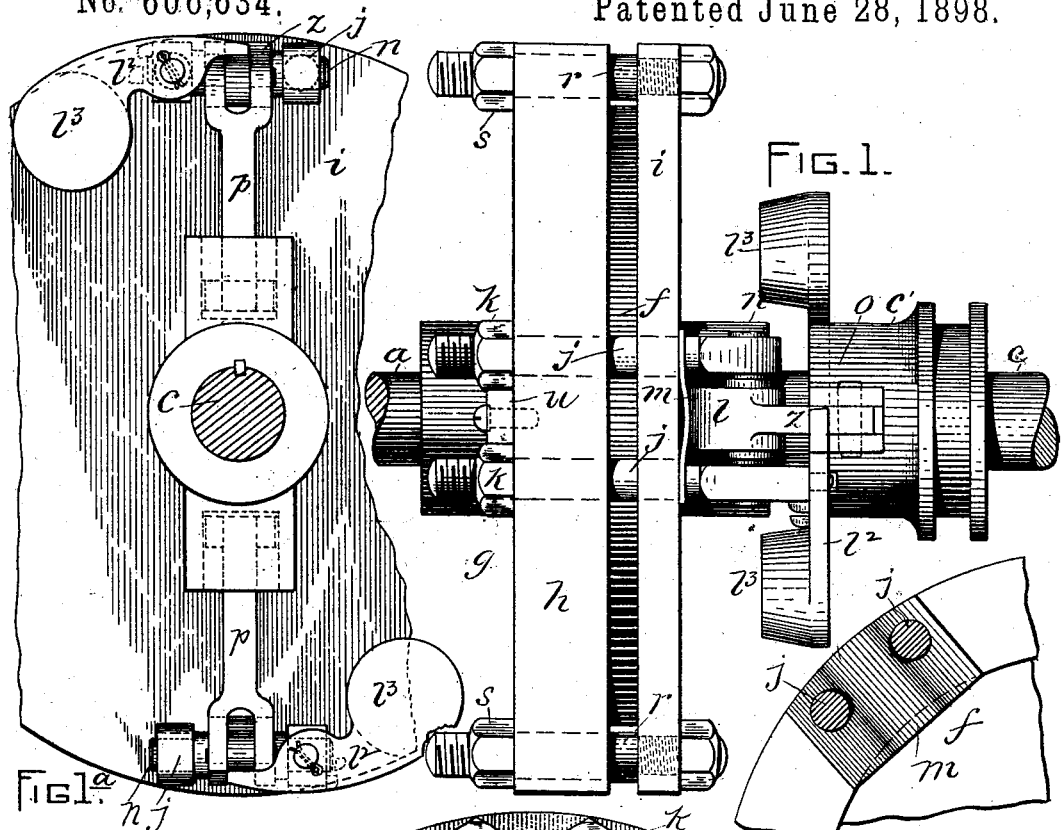
Fig. 1.
Fig. 1ª.
Fig. 3.
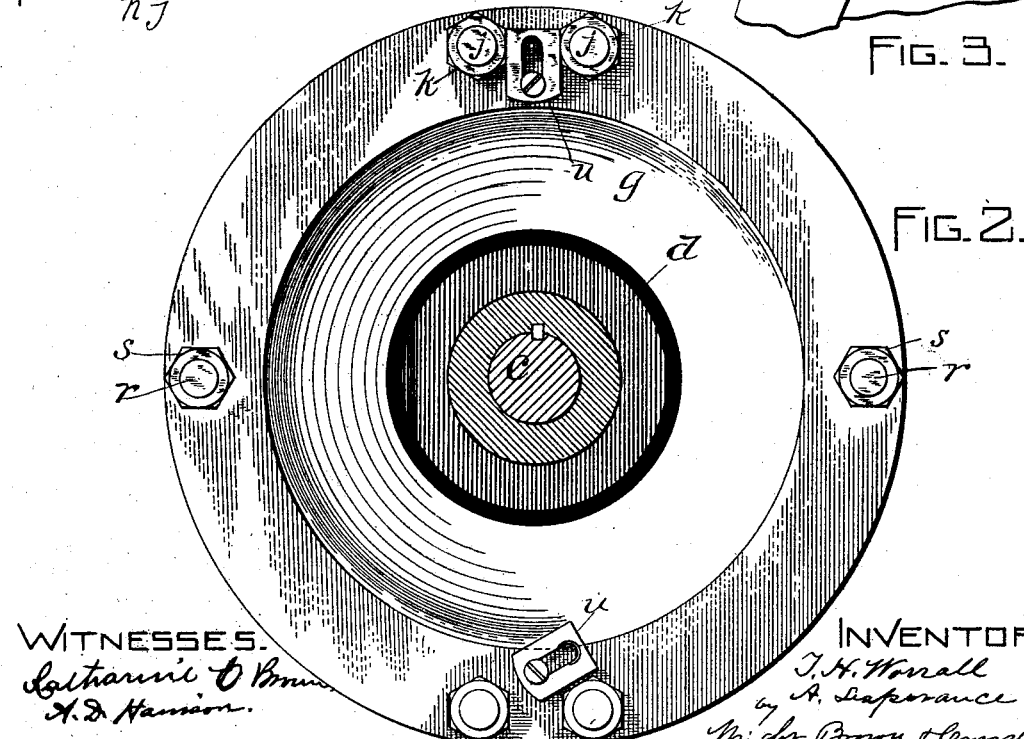
Fig. 2.
WITNESSES.
INVENTORS.

(No Model.) 3 Sheets—Sheet 2.

T. H. WORRALL & A. LESPERANCE.
FRICTION CLUTCH.

No. 606,634. Patented June 28, 1898.

WITNESSES.

INVENTORS
T. H. Worrall
A. Lesperance.

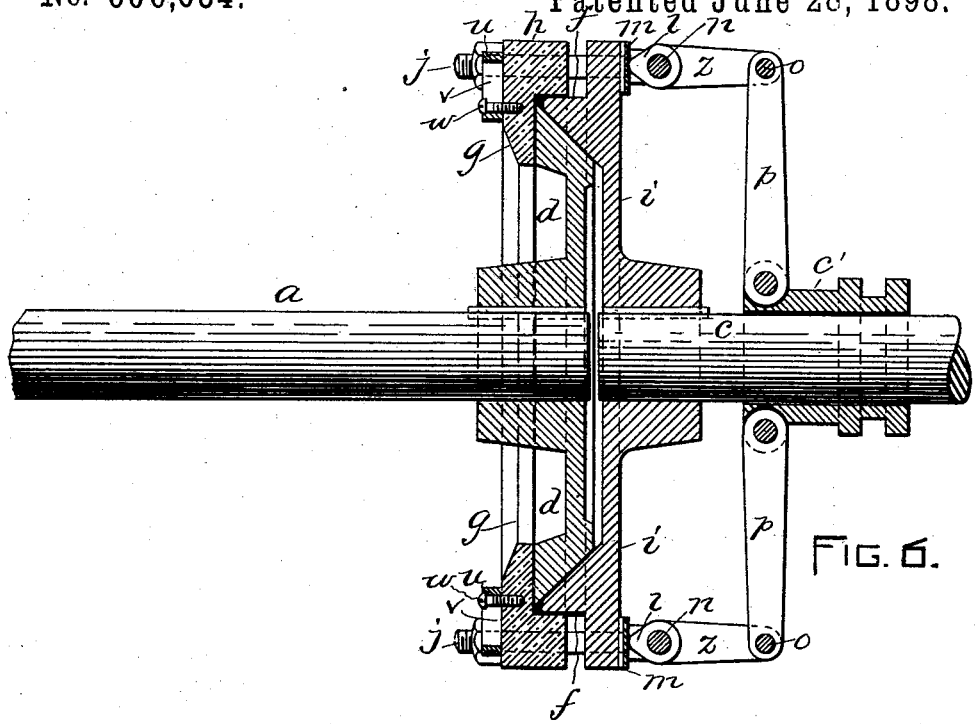

UNITED STATES PATENT OFFICE.

THOMAS H. WORRALL AND ALEXANDER LESPERANCE, OF LACONIA, NEW HAMPSHIRE; SAID LESPERANCE ASSIGNOR TO SAID WORRALL.

FRICTION-CLUTCH.

SPECIFICATION forming part of Letters Patent No. 606,634, dated June 28, 1898.

Application filed March 18, 1893. Serial No. 466,586. (No model.)

*To all whom it may concern:*

Be it known that we, THOMAS H. WORRALL and ALEXANDER LESPERANCE, of Laconia, in the county of Belknap and State of New Hampshire, have invented certain new and useful Improvements in Friction-Clutches, of which the following is a specification.

This invention relates to an improvement in clutches of the type shown in Patent No. 463,812, granted November 24, 1891; and one object of the invention is to secure a perfect alinement of two shafts arranged end to end and designed to be coupled and uncoupled by the improved clutch, the peculiar formation of the clutch parts being such as to produce the alining effect, while at the same time possessing superior clutching properties.

A further object of the invention is to provide means for counteracting the effect centrifugal force is found to have in so tightly pressing the clutch parts together as to render it difficult to operate the clutch when moving at high speed.

The invention also has in view certain details of construction whereby the clutch is improved.

To the above ends the invention consists in the novel construction and combinations of parts recited in the appended claims.

The drawings which accompany and form part of this specification illustrate an embodiment of the invention.

Figure 4:
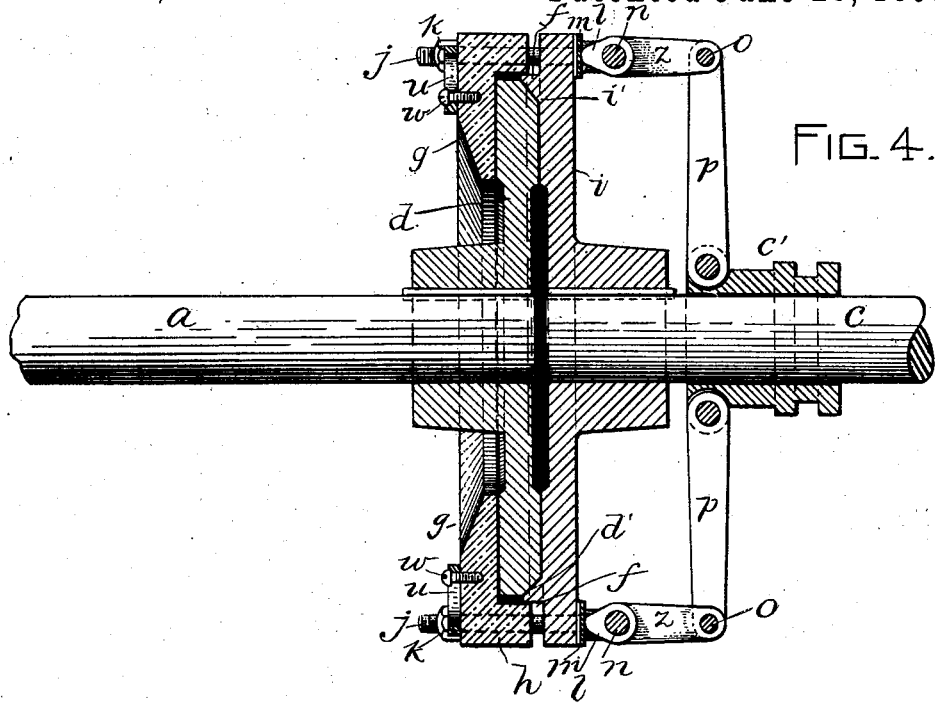
Figure 5:
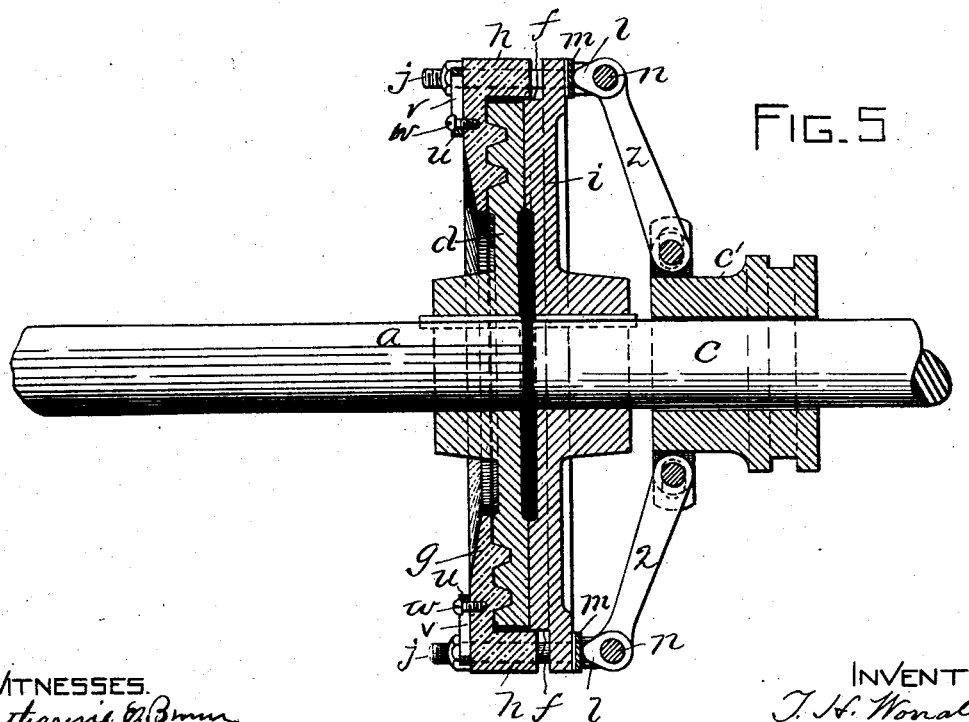

Figure 1 shows the clutch in side elevation. Fig. 1ª shows a fragmentary elevation looking from the right-hand end of Fig. 1. Fig. 2 shows an elevation looking from the left-hand end of Fig. 1. Fig. 3 shows a detail face view of certain parts seen in Fig. 1. Figs. 4, 5, and 6 show longitudinal sections illustrating different formations of the clutch parts.

In the drawings the letters $a$ and $c$ designate two shafts arranged end to end and designed to be coupled and uncoupled by means of our improved form of clutch, which also preserves their alinement. Clutch-disks $d$ and $i$ are keyed to said shafts, respectively, at the ends thereof and have confronting frictional faces, by engagement of which the two shafts are caused to be rotated together by power being applied to one of them. One or both of the disks may be movable longitudinally for purposes of clutching and unclutching, or one or both of the shafts may be allowed sufficient longitudinal movement for the purpose.

The means for effecting the clutching and unclutching movements of the disks, or one of them, are of the following description:

A ring $g$ bears against the rear side of the disk $d$ and is preferably formed with a marginal flange $h$, which extends over the periphery of said disk and also over the peripheral surface or shoulder $f$ of the disk $i$, the latter extending sufficiently beyond said shoulder to bring its outmost peripheral surface flush with that of the ring $g$. Bolts $j$ extend loosely through the marginal portions of the ring $g$ and disk $i$, said bolts being arranged in pairs at diametrically opposite sides of the clutch, as shown in Fig. 2. These bolts are screw-threaded at their ends beyond the ring $g$ and bear hexagonal nuts $k$, which screw up against the back of said ring and are locked in pairs by means of plates $u$, slotted longitudinally, as at $u'$, to accommodate the shanks of screws $a$, entered in the ring and supporting the locking-plates. Each locking-plate is recessed in the outer side around one end of the slot, as at $u^2$, to receive the head of the screw when the plate is locked in its nut-securing position. It will be seen that by pushing the plate between the two nuts, with its edges engaged with two of the flat sides of the latter, as shown at the upper part of Fig. 2, the nuts will be securely locked in place and cannot be turned until the plate is released and withdrawn, as shown at the lower part of Fig. 2. The opposite ends of the bolts which project out from the disks $i$ are formed with flattened and rounded heads, which are bored to receive pivot-pins $n$, on which are mounted levers $z$, having cam-shaped ends $l$ to act against the disk $i$, between which and said cams, however, there are interposed the flat bowed springs $m$, perforated for engagement with the bolts $j$, which confine them in place. Links $p$ are jointed to the outer ends of levers $z$ by pins $o$, and the inner ends of said links are pivoted between ears formed on a collar $c'$, which slides on the shaft $c$ and is circumferentially grooved to receive a forked operating-lever or shipper. (Not shown.) It will now be seen that the shifting of the collar $c$ will produce movements of the levers $z$, and when moved in one direction the cams $l$ will be forced against the springs $m$ with the effect of drawing together the clutch-disks, and thereby frictionally connecting the two shafts. The interposition of the springs is advantageous in equalizing the action of the cams to produce a uniform clutching effect all around the clutch and also in taking up wear. When the parts, however, have become considerably worn, the bolts $j$ will be tightened up by first releasing and withdrawing the locking-plates and then turning the nuts $k$ through one-sixth or multiples of one-sixth of a rotation, when the plates can again be pushed in between them.

In order to counteract the effect centrifugal force would have at high speed upon the cam-levers, resulting in jamming the clutch-disks so tightly together as to make difficult their separation, we employ the following-described instrumentalities: Levers $b^2$ are pivoted at opposite sides of the clutch upon studs formed on the heads of two of the bolts $j$, and said levers bear against the outer edges of the levers $z$, respectively, being suitably formed on one side of their pivots for that purpose. Said levers $l^2$ on the opposite sides of their pivots carry weights $l^3$, and the outward tendency of these weights consequent upon a high speed of rotation will cause the inner ends of their levers to resist movement of the cam-levers by centrifugal force in a way to increase the pressure of the clutch-disks against each other. Dowel-pins $r$ pass through the marginal portions of the ring $g$ and disk $i$ at points half-way between the pairs of bolts $j$, said dowel-pins being threaded at their ends to receive nuts $s$, bearing against the ring and disk, respectively. By means of these dowel-pins and their nuts the two clutch-disks can be drawn together and so held when it is desired to maintain a permanent coupling between the two shafts. These dowel-pins also serve to relieve the strain or drag on the bolts $j$ at the commencement of the clutching operation. Of course instead of being screwed at both ends the said dowel-pins might have heads on one end. The object before stated of effecting a perfect alinement of the shafts is accomplished by means of annular interlocking bevels on the clutch members, and we have shown in the accompanying drawings a number of different ways of disposing the bevels.

In Fig. 4 the disk $d$ is represented as beveled to a limited extent at its margin in the side toward the disk $i$, as shown at $d'$, and the said disk is formed with a corresponding bevel $i'$, extending from the shoulder $f$ to the flat inside face of the disk. It will be observed that with this construction both the beveled surfaces and the flat confronting surfaces of the disks are employed as frictional coacting surfaces whose engagement effects the coupling of the shafts.

In the construction shown in Fig. 5 the alining bevels occur between the ring $g$ and the back of the disk $d$, these parts being formed with interlocking annular ribs and grooves or corrugations $d''$ and $i''$ with beveled sides. It will also be observed that in this figure the cam-levers are represented as angular and jointed to the sliding sleeve, the links being dispensed with.

In the construction shown in Fig. 6 the annular bevel on the disk $d$ extends entirely across it, as shown at $d^2$, giving said disk a frusto-conical form, with the small end toward the disk $i$. The latter is turned out with a corresponding bevel $i^2$, and it is to be noted that the whole contact between the two disks is on their beveled surfaces.

It will be readily understood that with any of the forms of bevels shown their engagement will preserve alinement of the shafts.

Having thus set forth embodiments of our invention, what we claim is as follows:

1. In a friction-clutch, the combination of confronting clutch-disks carried by the rotary members to be connected, a ring bearing against one of said disks on its side opposite the other disk, bolts passing through the latter and the ring, cam-levers pivoted to said bolts, flat bowed springs interposed between the cam-levers and the clutch-disk, and means for operating the cam-levers.

2. In a friction-clutch, the combination of confronting clutch-disks carried by the rotary members to be connected, a ring bearing against one of said disks on its side opposite the other disk, bolts passing through the latter and the ring, nuts on said bolts and bearing against the ring, slotted locking-plates for engaging said nuts, screws supporting said plates by engagement with their slots, and means applied to the bolts and the disks they engage for drawing the disks together.

3. In a friction-clutch, the combination of confronting clutch-disks carried by the rotary members to be connected, a ring bearing against one of said disks on its side opposite the other disk, connections between the latter and the ring, cam-levers applied to said connections, means for actuating said cam-levers, and weighted levers coacting with the cam-levers to counteract centrifugal effect, substantially as described.

4. In a friction-clutch, the combination of confronting clutch-disks carried by the rotary members to be connected, a ring bearing against one of said disks on its side opposite the other disk, bolts passing through the latter and the ring, cam-levers pivoted to said bolts, means for actuating said cam-levers, and weighted levers pivoted to certain of the bolts and coacting with the cam-levers to counteract centrifugal effect, substantially as in the manner described.

In testimony whereof we have signed our names to this specification, in the presence of two subscribing witnesses, this 3d day of January, A. D. 1893.

THOMAS H. WORRALL.
  ALEXANDER LESPERANCE.

Witnesses:
 EDGAR F. REEVES,
 JOHN W. ASHMAN.